(12) United States Patent
Hammerschmidt

(10) Patent No.: US 8,082,075 B2
(45) Date of Patent: Dec. 20, 2011

(54) TIRE SENSOR SYSTEM AND METHOD

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1134 days.

(21) Appl. No.: 11/853,135

(22) Filed: Sep. 11, 2007

(65) Prior Publication Data

US 2009/0069969 A1 Mar. 12, 2009

(51) Int. Cl.
*G06F 7/00* (2006.01)
(52) U.S. Cl. ........................................................ 701/29
(58) Field of Classification Search .................... 701/29, 701/33; 340/442; 73/8; 116/34 R
See application file for complete search history.

(56) References Cited

U.S. PATENT DOCUMENTS

| 5,749,984 | A | 5/1998 | Frey et al. | |
|---|---|---|---|---|
| 5,877,679 | A | 3/1999 | Prottey | |
| 6,539,295 | B1 * | 3/2003 | Katzen et al. | 701/29 |
| 2004/0030479 | A1 * | 2/2004 | Arndt et al. | 701/70 |
| 2007/0240501 | A1 * | 10/2007 | Mancosu et al. | 73/146 |

* cited by examiner

*Primary Examiner* — Kim T Nguyen
(74) *Attorney, Agent, or Firm* — Dicke, Billig & Czaja, PLLC

(57) ABSTRACT

A tire sensor system includes a first sensor and a second sensor spaced apart from the first sensor. The first and second sensors are mounted to a tire. A processor receives input signals from the first and second sensors, and is programmed to determine the length of a contact patch of the tire in response to the input signals.

25 Claims, 5 Drawing Sheets

TIRE SENSOR SYSTEM AND METHOD

BACKGROUND

This disclosure relates generally to tires, and more particularly to sensors for tires.

Many different types of sensor devices exist for providing information about the tires of a wheeled vehicle. In order to optimize vehicle performance and minimize tire wear, it is desirable to monitor and maintain such tire characteristics as proper tire inflation and tire loading. For instance, tire over-inflation and/or under-inflation can lead to uneven tread wear, lessened grip at the tire-to-road interface, and reduced tire performance, among other things.

Known sensors for providing such information typically are mounted to the tire in various locations, such as in the tread, sidewall, inside the tire, etc. Existing sensors tend to be complicated to operate and difficult to mount to a tire.

For these and other reasons, there is a need for the present invention.

SUMMARY

In accordance with embodiments of the invention, a tire sensor system includes a first sensor a second sensor spaced apart from the first sensor. A processor receives input signals from the first and second sensors and is programmed to determine the length of a contact patch of the tire in response to the input signals.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
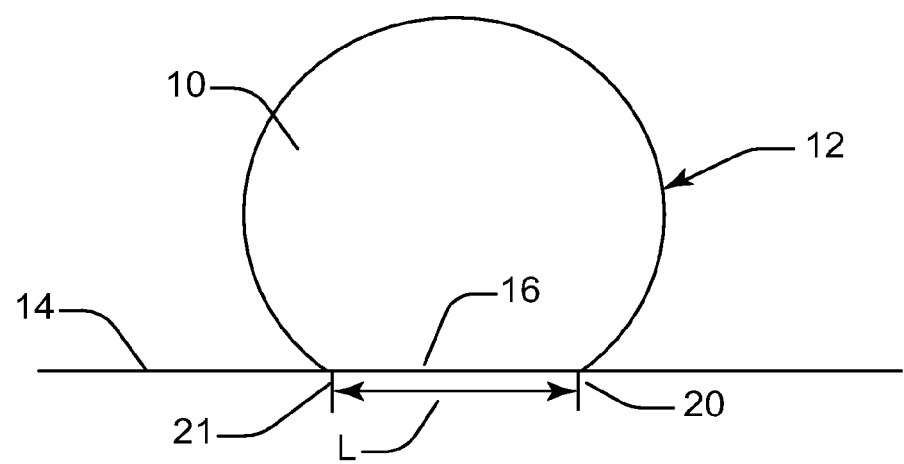
FIG. 1 is a block diagram conceptually illustrating portions of a typical tire.

Many different types of wheeled vehicles use pneumatic tires (in this specification, the term tire generally refers to a pneumatic tire). Typically, a tire is mounted on the rim of a wheel and is in contact with a surface such as a road surface. FIG. 1 conceptually illustrates portions of a typical tire. The tire 10 includes an outer periphery 12 that typically has a tread formed about its circumference for contacting an underlying surface 14. The outer peripheral portion 12 has a constant circumferential length which is substantially round. However, under vehicle load, the outer periphery 12 has a flattened area 16 at the tire-to-road surface interface. The portion 16 of a tire that is in actual contact with the road surface—the bearing surface of the tire 10—is referred to as the contact patch. The contact patch 16 is generally shown having a length L, which is defined by outer boundaries 20, 21 at opposite ends of the contact patch 16.

Determining the length L of a tire's contact patch 16, or bearing surface, can provide much useful information. For example, the shape or length of the contact patch can have a great effect on the handling of the vehicle to which the tire is mounted. The length of the contact patch varies in relation to the inflation pressure of the tire under a constant vehicle load. Thus, if the vehicle load is constant, increasing the inflation pressure shortens the contact patch, and decreasing the inflation pressure lengthens the contact patch.

Figure 2:
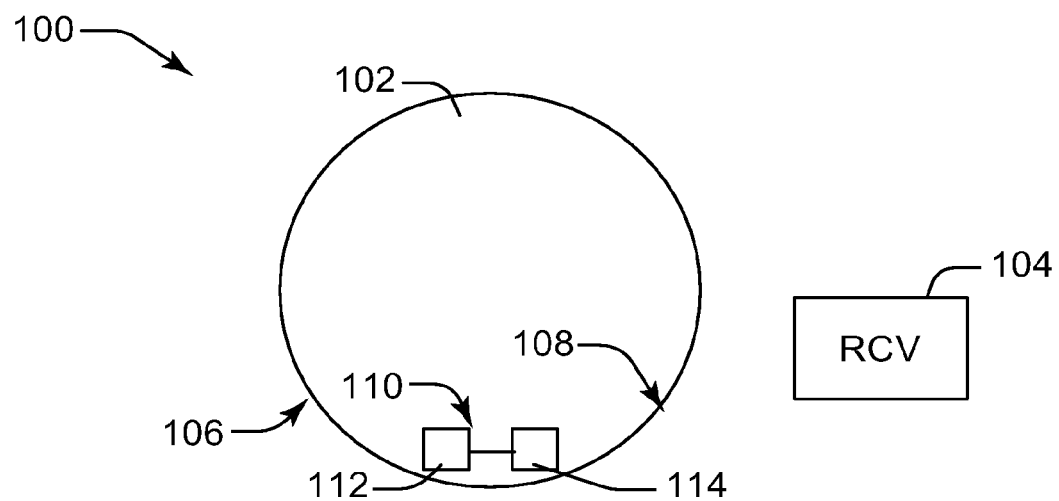
FIG. 2 is a block diagram conceptually illustrating a tire system in accordance with exemplary embodiments of the present invention.

FIG. 2 is a block diagram conceptually illustrating a tire system 100 in accordance with embodiments of the present invention. The system 100 includes a tire 102 with a sensor system 110 that transmits information about the tire 102 to a receiver 104. The receiver 104 can be located in a vehicle to which the tire 102 is mounted, or it can be separate from any such vehicle. Information can be transmitted from the sensor system 110 to the receiver 104 in any suitable manner.

The sensor system 110 includes two sensors 112, 114 mounted to the tire 102. The block diagram of FIG. 2 conceptually illustrates a side view of the tire 102, showing the sensors 112, 114 situated spaced apart and one in front of the other in the direction the tire 102 rotates (across the paper as illustrated). In the illustrated embodiment, the sensors 112, 114 are mounted inside the tire 102, on an inside surface 108 opposite the outer periphery 106 (defining the tire's tread) of the tire 102. The sensors 112,114 each output a signal indicating the distance between a predetermined position and the inside surface 108. For instance, the sensors 112,114 could indicate the distance between the respective sensors themselves and the inside surface 108, or signal output could indicate the distance between portions of the respective sensors 112,114 and the inside surface 108.

Figure 3:
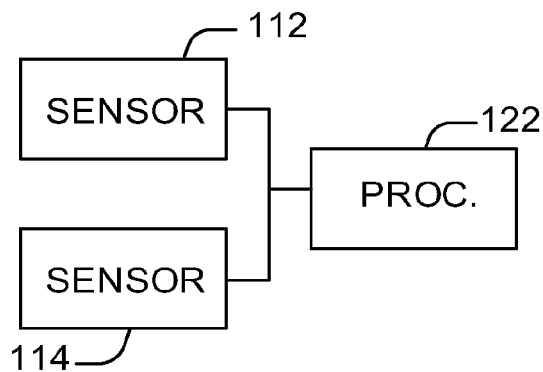
FIG. 3 is a block diagram illustrating the sensors shown in FIG. 2 connected to a processing device.

As shown in FIG. 3, the outputs of the sensors 112, 114 are received by an integrated circuit processing device 122, such as a digital signal processor (DSP), microcontroller or microprocessor. The processor 122 could be integral to the sensor system 110 or as part of the receiver 104. The processor 122 is programmed to determine the length of the contact patch in response to the signals from the sensors 112, 114.

Figure 4:
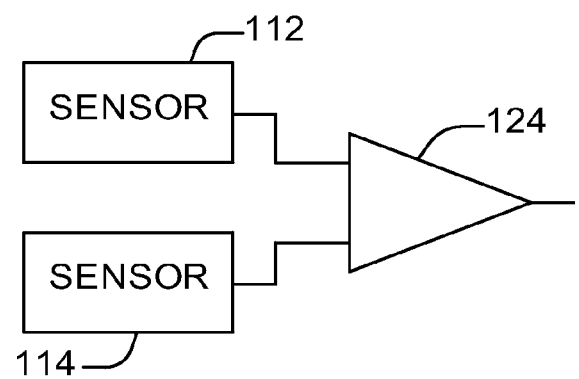
FIG. 4 is a block diagram illustrating the sensors shown in FIG. 2 connected to a comparator.

FIG. 4 illustrates a comparator 124 receiving signals from the sensors 112,114 as inputs. The comparator 124, which would typically be a part of the processor 122, provides an output in response to a predetermined difference in input signals received from the sensors 112, 114. As shown in FIG. 2, the sensors 112, 114 are spaced apart from one another and are each located about the same distance from the inside surface 108 of the tire 102, since the representation of the tire 102 shown has a constant radius as would be the case with a tire that is not bearing a load. Thus, the output signals from the sensors 112,114 indicating the distance between the respective sensor and the inside surface 108 will be about the same, and the difference between such signals will be at a minimum.

When the tire 102 is loaded and rotating, however, the distance between the sensors 112,114 and the inside surface 108 will vary as the location of the sensor system 110 transitions to and from the contact patch of the tire 102. When the sensor system 110 reaches a boundary or transition point of the contact patch, one of the sensors will temporarily be located over the contact patch, while the other sensor will be outside the contact patch. In this situation, the sensor over the flattened-out contact patch will be closer to the inside surface 108 of the tire 102, resulting in an increased difference in the signals output by the sensors 112, 114.

Figure 5:
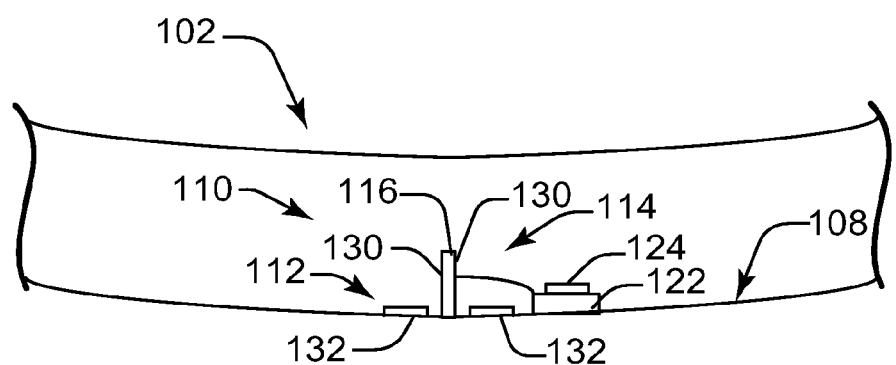
FIG. 5 is a block diagram schematically showing a side view of a tire system in accordance with exemplary embodiments of the present invention.

FIG. 5 illustrates an example of the sensor system 110 in which the sensors 112, 114 are capacitive sensors. The sensors 112, 114 include first and second conductive electrodes 130, 132 spaced apart from one another to form the plates of a capacitor. In the embodiment shown in FIG. 5, the second, or lower electrodes 132 of the sensors 112,114 mounted to the inside surface 108 of the tire 102 and spaced apart from one another. The second electrodes 132 can be attached to the inside surface 108 or embedded in the tire 102 itself. A conductive pillar 116 is situated between the second electrodes 132 to form the second electrodes 130 of the sensors 112,114. A power source 124, such as a battery, is connected to the processor 122 and the sensors 112, 114 so that the capacitance of the respective sensors 112, 114, and the differential signal, can be measured. In certain exemplary embodiments, components such as the power source 124 and processor 122 are also mounted on the inside surface 108 of the 102.

The distance between the first and second electrodes 130, 132 is approximately the same for each sensor 112,114 when the sensor system 110 is located at a position of the tire 102 having a constant radius, such as a position outside the contact patch. However, when the rotating tire positions the sensor system 110 at a location where the tire is transitioning to or from the contact patch—in other words, at one of the boundaries of the contact patch—the distance between the first and second plates 130,132 will not be the same for both sensors 112, 114.

Figure 6:
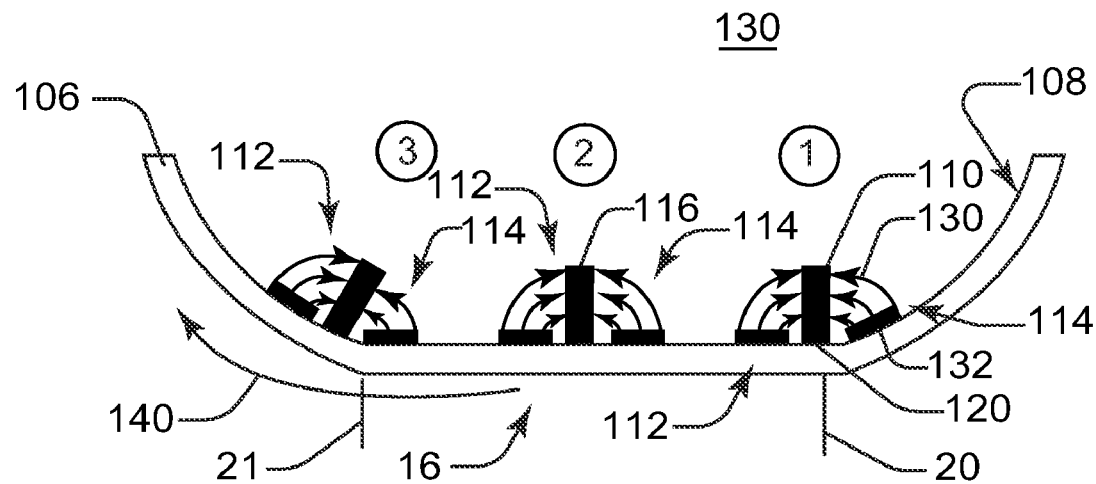
FIG. 6 is a block diagram illustrating the tire sensor system of FIG. 5 at various positions of a rotating tire.

FIG. 6 illustrates the sensor system 110 at three different positions as the tire 102 rotates in the direction shown by the arrow 140. In position 1, the sensor system 110 is entering the contact patch 16, so that the first sensor 112 is positioned on one side of a boundary or transition point 20 and the second sensor 114 is on the other side of the transition point 20. As a result, the distance between the first and second electrodes 130, 132 of the second sensor 114 decreases, changing the capacitance as compared to the first sensor 112.

Figure 7:
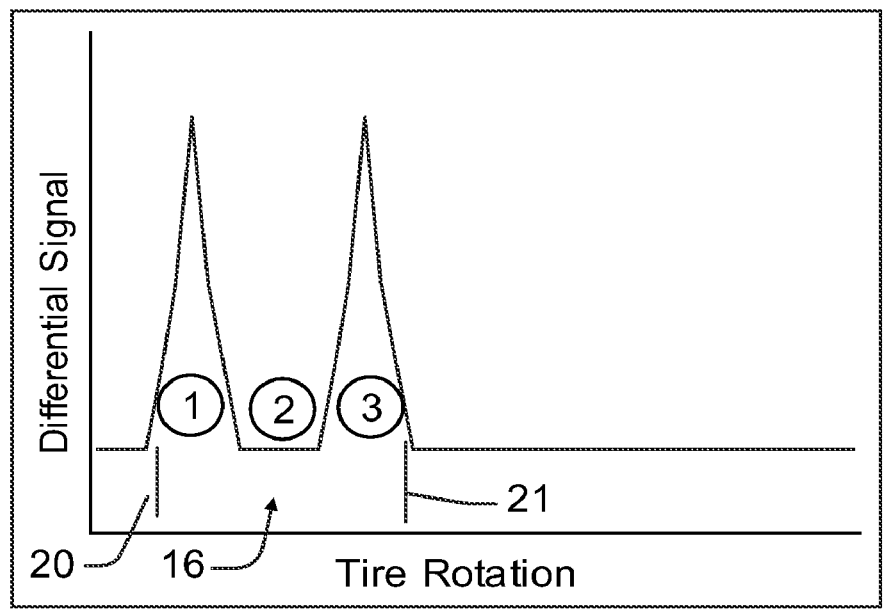
FIG. 7 is a chart showing variation of a differential signal between sensors rotating with a tire.

Hence, an increase in the difference between capacitance of the first and second sensors 112,114 signals the boundary 20 of the contact patch 16. This concept is illustrated in FIG. 7, which is a chart showing an example of the variation of the differential signal as the tire 102 rotates. The differential signal increases and reaches a maximum as the tire 102 rotates such that the sensor system 110 crosses the first boundary 20 of the contact patch 16 at position 1. As the tire 102 continues to rotate, the sensor system 110 moves completely into the area of the contact patch 16, as shown in position 2. In this location, the distance between the electrodes 130,132 is again essentially the same, so the difference in capacitance decreases back to a minimum. When the sensor system 110 reaches position 3, the distance between the electrodes 130,132 of the second sensor 114 again decreases, changing the capacitance of the second sensor 114 which increases the difference in capacitance between the first and second sensors 112,114, signaling the second boundary 21 of the contact patch 16. The length L of the contact patch 16 can then be calculated based on known parameters of the moving vehicle, such as the speed and distance traveled.

Alternatively, the total capacitance of the sensors 112,114 can be used to identify the boundaries 20, 21 of the contact patch 16. When the sensor system 110 is completely outside the contact patch 16, or completely within the contact patch 16 as shown in position 2, the distance between both sets of first and second electrodes 130,132 is at a maximum. Thus, the total capacitance is based on the two capacitors having a relatively large distance between their plates. When the sensor system 110 is located at the transition points 20 or 21, the distance between the plates of one of the capacitors decreases, increasing the capacitance of that sensor. Accordingly, when the sensor system 110 is located at one of the transition points, or boundaries 20, 21, the combined capacitance of the sensors 112,114 increases as compared to locations completely within or outside the contact patch 16.

Figure 8:
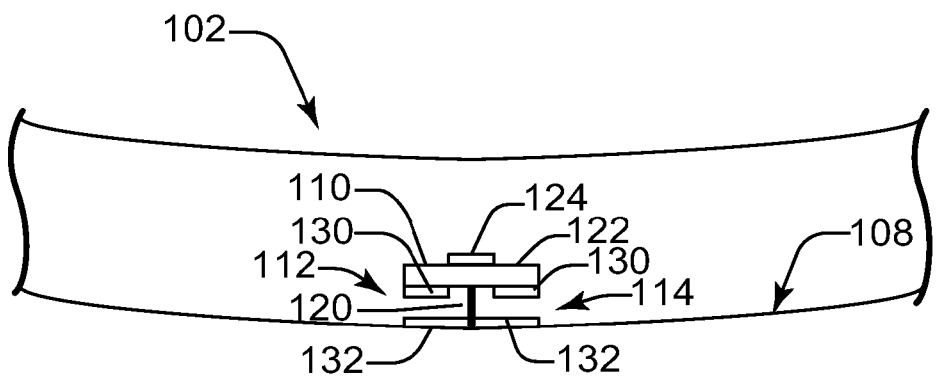
FIG. 8 is a block diagram schematically showing a side view of a tire system in accordance with another exemplary embodiment of the present invention.

FIG. 8 illustrates another example of the sensor system 110 in which the sensors 112, 114 are capacitive sensors. The first and second, or upper and lower electrodes 130, 132 of the sensors 112,114 are positioned one above the other and spaced apart from one another to form the plates of a capacitor. In certain embodiments the lower electrodes 132 of the sensors 112,114 are formed by a single conductive member so that the capacitors of the sensors 112,114. The conductive member can be attached to the inside surface 108 or embedded in the tire 102 itself. Embodiments are envisioned in which a steel belt of the tire functions as the lower electrodes. The power source 124 is connected to the processor 122 and the sensors 112, 114 so that the capacitance of the respective sensors 112, 114, and the differential signal, can be measured.

In the embodiment illustrated in FIG. 8, a mounting member or post 120 is attached to the lower electrode 132, which is in turn connected to the inside surface 108 of the tire 102. The distance between the upper and lower electrodes 130,132 is approximately the same when the sensor system 110 is located at a position of the tire 102 having a constant radius, such as a position outside the contact patch. When the rotating tire positions the sensor system 110 at one of the boundaries of the contact patch, the distance between the upper and lower plates 130,132 will not be the same for both sensors 112, 114.

Figure 9:
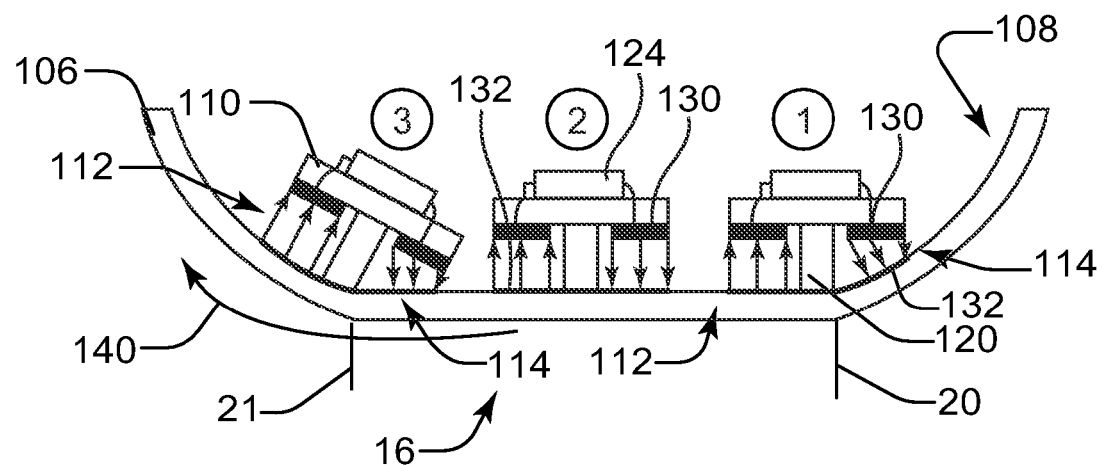
FIG. 9 is a block diagram illustrating the tire sensor system of FIG. 8 at various positions of a rotating tire.

FIG. 9 illustrates the sensor system 110 shown in FIG. 8 at three different positions as the tire 102 rotates in the direction shown by the arrow 140. In position 1, the sensor system 110 is entering the contact patch 16, so that the first sensor 112 is positioned on one side of the transition point 20 and the second sensor 114 is on the other side of the transition point 20. As a result, the distance between the first and second electrodes 130, 132 of the second sensor 114 decreases, changing the capacitance as compared to the first sensor 112.

The increase in the difference between capacitance of the first and second sensors 112,114 signals the boundary 20 of the contact patch 16. As the tire 102 continues to rotate, the sensor system 110 moves completely into the area of the contact patch 16, as shown in position 2. In this location, the distance between the electrodes 130,132 is again essentially the same, so the difference in capacitance decreases back to a minimum. When the sensor system 110 reaches position 3, the distance between the electrodes 130,132 of the second sensor 114 again decreases, changing the capacitance of the second sensor 114 which increases the difference in capacitance between the first and second sensors 112,114, signaling the second boundary 21 of the contact patch 16. The total capacitance results from a series connection of two capacitors having a relatively large distance between their plates when the sensor system 110 is at position 2. When the sensor system 110 is located at one of the transition points 20 21, such as shown in positions 1 and 3, the combined capacitance of the sensors 112,114 increases as compared to locations completely within or outside the contact patch 16.

Figure 10:
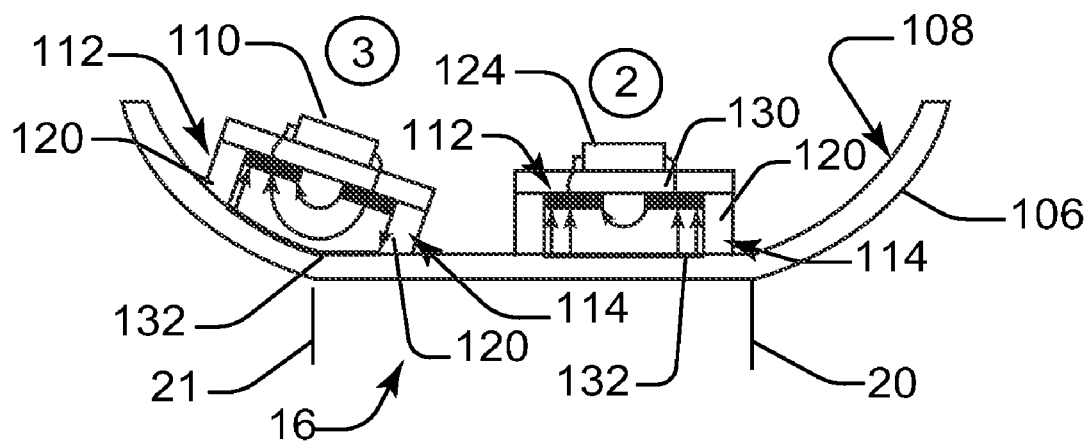
FIG. 10 is a block diagram illustrating an example of an alternative tire sensor system at various positions of a rotating tire.

FIG. 10 illustrates yet another embodiment of the sensor system 110. In the embodiment shown in FIG. 10, capacitive sensors are again used. In the embodiment illustrated in FIG. 10, the capacitive sensors 112,114 are situated between two mounting posts 120. In position 2, both sensors 112,114 of the sensor system 110 are located within the contact patch 16 so the first and second plates 130,132 of both sensors 112, 114 are about the same distance apart. Accordingly, the differential capacitance is at a minimum in this position. As the sensor system 110 moves with the tire 102 to position 3, the distance between the upper and lower plates 130,132 of the sensors 112,114 varies as the sensor system 110 moves past the transition point 21 of the contact patch 16, in turn changing the differential signal between the sensors 112,114.

Other embodiments are envisioned in which the sensors 112, 114 are magnetic or inductive sensors. For example, referring to FIG. 5, in alternative embodiments, rather than the sensors 112,114 having the upper plates 130, inductors are provided, and the lower electrode 132 comprises a conductive, non-magnetic electrode. A changing voltage is applied to the inductor from the supply 126 to generate a magnetic field, inducing eddy currents in the electrode 132. The losses in the induced eddy currents can then be measured. This will vary depending on the distance between the inductor and the electrode 132. Thus, when the distance between the inductor and the lower electrode 132 changes as the sensor system 110 transitions to or from the contact patch 16, the differential signal between the sensors 112,114 will increase, signaling the boundary of the contact patch 16.

Figure 11:
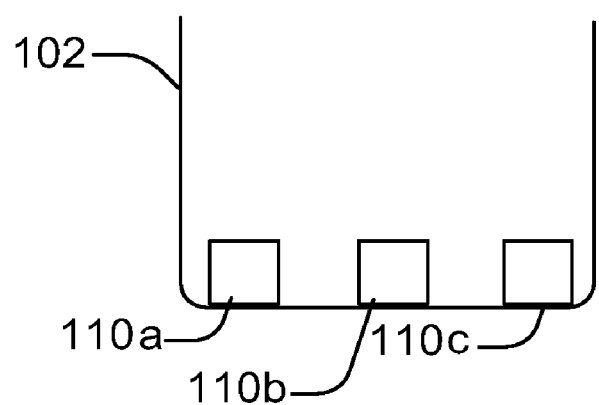
FIG. 11 is a block diagram conceptually illustrating an end view of a tire system having multiple sensor systems.

In further embodiments, additional sensor systems are provided. For instance, FIG. 11 conceptually shows an end view of a tire system having three sensor systems 110a, 110b, 110c, which have the structure and operate, for example, as disclosed in conjunction with FIGS. 2-8. The multiple sensor systems 110 extending across the width of the tire 102 provide additional information about the tire 102 and the vehicle to which the tire is mounted. For example, variations in the footprint of the contact patch 16 can be determined using multiple sensor systems as shown in FIG. 11, such as one side of the footprint increasing in size when the vehicle goes into a curve.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A tire sensor system, comprising:
a first sensor;
a second sensor spaced apart from the first sensor; and
a processor receiving input signals from the first and second sensors, wherein the processor is programmed to determine a boundary of a contact patch of a tire in response to the input signals when the first sensor is outside the contact patch and the second sensor is over the contact patch.

2. The tire sensor system of claim 1, wherein:
the first and second sensors include first and second capacitors, respectively;
a difference in capacitance between the first and second capacitors varies in response to being positioned proximate the boundary.

3. The tire sensor system of claim 2, wherein the first and second capacitors each include first and second electrodes spaced apart from one another by a distance, and wherein the distance varies in response to being positioned proximate the boundary.

4. The tire sensor system of claim 3, wherein the second electrode of the first and second capacitors comprises a single electrode.

5. The tire sensor system of claim 3, wherein the second electrode of the first and second capacitors is a conductive member situated between and generally perpendicular to the second electrode of the first capacitor and the first electrode of the second capacitor.

6. The tire sensor system of claim 3, wherein the second electrode of the first and second capacitors is attached to a mounting device.

7. The tire sensor system of claim 6, wherein the mounting device includes a first end connected between the first and second sensors and a second end attachable to the tire.

8. The tire sensor system of claim 1, further comprising first and second mounting members, the first mounting member having a first end connected adjacent the first sensor and a second end attachable to the tire, the second mounting member having a first end connected adjacent the second sensor and a second end attachable to the tire, such that the first and second sensors are positioned between the first and second mounting members.

9. The tire sensor system of claim 1, wherein the first and second sensors output first and second signals indicating a distance between a predetermined position and an inside surface of the tire.

10. The tire sensor system of claim 9, wherein the processor determines the difference between the first and second signals output by the first and second sensors.

11. A tire system, comprising:
a tire;
a sensor system including a first sensor mounted to the tire and a second sensor mounted to the tire spaced apart from the first sensor in a direction the tire rotates; and
a processor receiving input signals from the first and second sensors, wherein the processor is programmed to determine a length of a contact patch of the tire in response to the input signals.

12. The tire system of claim 11, wherein:
the first and second sensors include first and second capacitors, respectively;
the contact patch defines a first boundary at one end of the contact patch; and wherein
a difference in capacitance between the first and second capacitors varies in response to being positioned proximate the first boundary.

13. The tire system of claim 12, wherein the first and second capacitors each include first and second electrodes spaced apart from one another by a distance, and wherein the distance varies in response to being positioned proximate the boundary.

14. The tire system of claim 13, wherein the second electrode of the first and second capacitors comprises a single electrode.

15. The tire system of claim 13, wherein the second electrode of the first and second capacitors is attached to the tire.

16. The tire system of claim 13, wherein the second electrode of the first and second capacitors is a conductive member situated between and generally perpendicular to the second electrode of the first capacitor and the first electrode of the second capacitor.

17. The tire system of claim 11, further comprising a mounting member having a first end connected between the first and second sensors and a second end attached to the tire.

18. The tire system of claim 11, further comprising first and second mounting members, the first mounting member having a first end connected adjacent the first sensor and a second end attached to the tire, the second mounting member having a first end connected adjacent the second sensor and a second end attached to the tire, such that the first and second sensors are positioned between the first and second mounting members.

19. The tire system of claim 11, further comprising a plurality of the sensor systems situated across a width of the tire.

20. The tire system of claim 11, wherein the sensor system includes a transmitter, and wherein the tire system further comprises a receiver receiving information transmitted by the transmitter.

21. A method for determining boundaries of a tire contact patch, comprising:

determining a distance between a first sensor and an inside surface of a tire;

determining a distance between a second sensor and the inside surface of the tire;

determining a first boundary of the tire contact patch in response to a difference in the distances between the first and second sensors and the inside surface of the tire when the first sensor is outside the contact patch and the second sensor is over the contact patch.

22. The method of claim 21, wherein determining the distances between the first and second sensors and the inside surface of the tire includes determining a capacitance of the first and second sensors.

23. The method of claim 21, wherein the first and second sensors each include first and second electrodes spaced apart from one another by a distance, and wherein the distance varies in response to being positioned proximate a boundary.

24. The method of claim 21, further comprising transmitting information from the first and second sensors to a receiver external to the tire.

25. A tire system, comprising:

a tire;

first means for determining a distance between a first location and an inside surface of the tire;

second means for determining a distance between a second location and an inside surface of the tire, the second means being spaced apart from the first means; and a processor receiving input signals from the first and second means, wherein the processor is programmed to determine a boundary of a contact patch of the tire in response to the input signals when the first sensor is outside the contact patch and the second sensor is over the contact patch.

* * * * *